United States Patent [19]

Laville et al.

[11] Patent Number: 4,696,511

[45] Date of Patent: Sep. 29, 1987

[54] OPENING ROOF ARRANGEMENT FOR A MOTOR VEHICLE ROOF

[75] Inventors: Bernard Laville, Bressuire; Philippe Prouteau, Airvault, both of France

[73] Assignee: Etablissements Farnier & Penin, France

[21] Appl. No.: 911,336

[22] Filed: Sep. 25, 1986

[30] Foreign Application Priority Data

Sep. 26, 1985 [FR] France ............................... 85 14270

[51] Int. Cl.$^4$ ........................... B60J 7/047; B60J 7/11
[52] U.S. Cl. .................................. 296/216; 296/218; 296/220
[58] Field of Search ................ 296/216, 218, 220, 222

[56] References Cited

U.S. PATENT DOCUMENTS

| 1,826,871 | 10/1931 | Ford | 296/220 |
|---|---|---|---|
| 3,589,778 | 6/1971 | Olson | 312/348 X |
| 4,005,900 | 2/1977 | Rauthmann | 296/218 |
| 4,407,541 | 10/1983 | Boots | 296/216 |

Primary Examiner—Dennis H. Pedder
Attorney, Agent, or Firm—Gerald J. Ferguson, Jr.; Michael P. Hoffman; Ronni S. Malamud

[57] ABSTRACT

An opening roof arrangement for a motor vehicle roof which consists of a carrier structure in the form of a frame which is capable of being mounted in an opening in the vehicle roof and retained on the edge thereof. A panel is mounted to a support assembly pivotally mounted on the frame about a pivot axis which is parallel to and in the vicinity of the front edge of the frame. An operating and locking member is mounted to the support assembly and co-operates with a rear edge of the frame to cause the support assembly to pivot from a first position in which it extends in a horizontal plane of the frame, the panel forming a closure system for the opening by resting on a seal provided on the inside edge of the frame, to a second position in which the support assembly is inclined with respect to the horizontal plane of the frame about the pivot axis. The support assembly is formed by a pair of parallel telescopic struts which are substantially perpendicular to the pivot axis, each strut having a slideway member which is pivotally mounted at one end thereof about the axis and a slider mounted slidably on the slideway member. The panel is connected to each of the struts by a fixing member having a first lug mounted slidably in the slideway member and a second lug mounted slidably in the slider.

4 Claims, 4 Drawing Figures

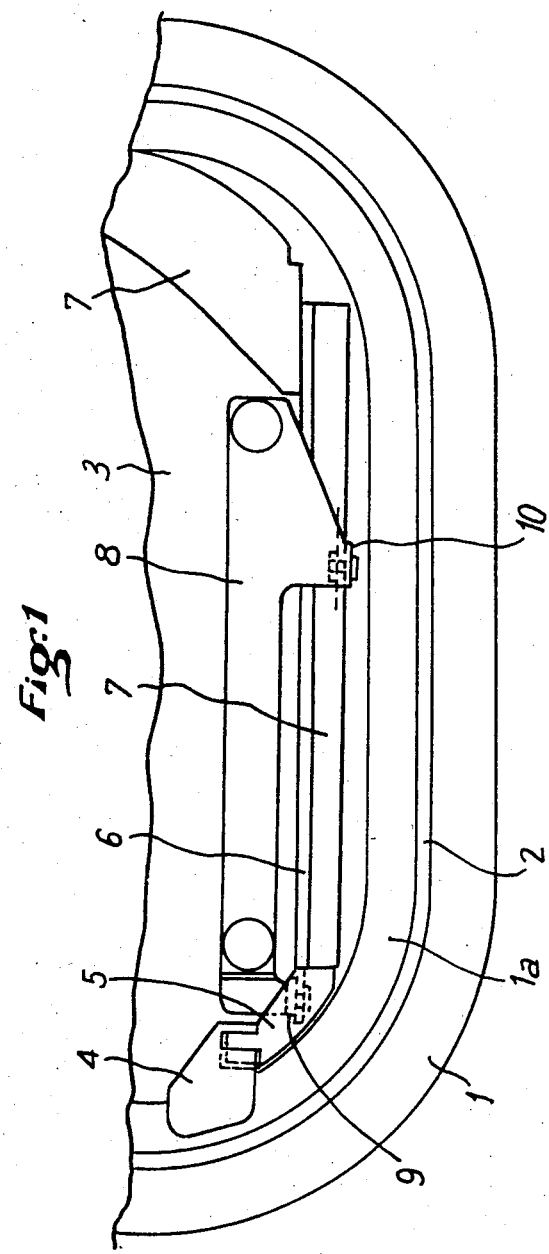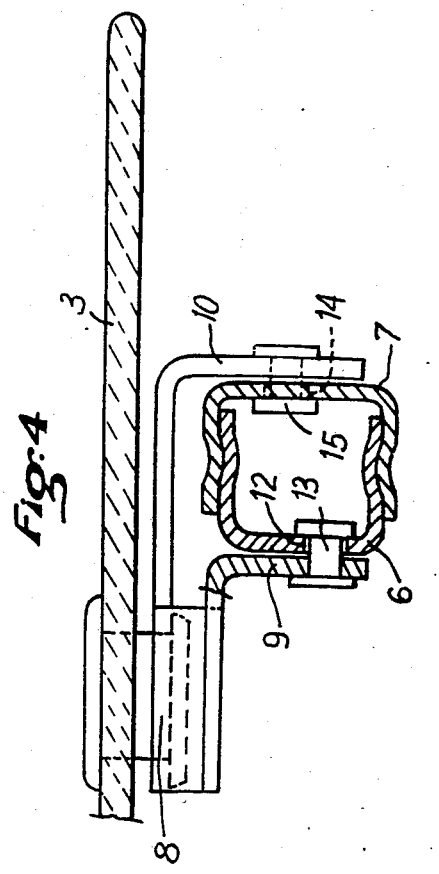

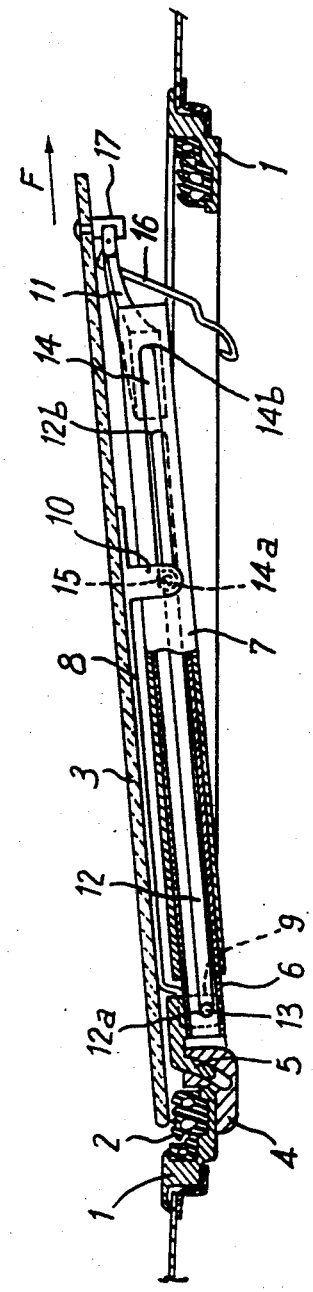
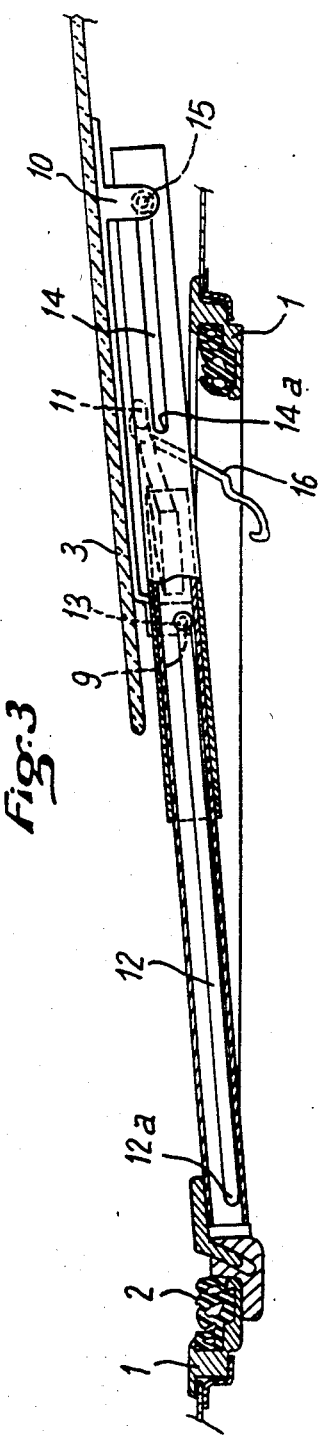

OPENING ROOF ARRANGEMENT FOR A MOTOR VEHICLE ROOF

The present invention concerns an opening roof arrangement for a motor vehicle roof, which can be disposed either in a first raised position or in a second raised position.

Opening roof arrangements for motor vehicles are known, which are formed by a frame and a co-operating counter-frame; the frame and the counter-frame grip between them the thickness of the sheet metal of the roof, which has an opening therein. The frame and the counter-frame form a carrier structure for a panel, either of glass or of a sheet metal, which is pivotally mounted about a hinge provided at the front of the carrier structure, by means of a system which permits lifting movement of the rearward part of the panel to form a ventilating system for the passenger compartment of the vehicle and optionally, a small translatory movement of the panel in order to uncover a part of the internal space of the carrier structure.

The known mechanisms for providing the translatory movement of the panel for uncovering a part of the opening in the motor vehicle roof are generally complicated and expensive. For the most part, they comprise a linkage system which performs on the one hand the function involving the lifting movement of the rearward part of the panel and on the other hand the translatory function, operating on the basis of the principle of a pivotal parallelogram.

The present invention seeks to propose an opening roof arrangement which permits a translatory movement of the pivotally mounted panel, outside the vehicle, of an amplitude which is considerably increased in comparison with that which is possible at the present time.

Thus, with the present invention, it is possible to uncover more than half the opening which is provided in the roof of the vehicle.

The invention therefore provides an "opening roof arrangement" for a motor vehicle roof, formed by a carrier structure in the form of a frame which is capable of being mounted in the opening in the roof and retained to the edges thereof, a panel which is fixed with respect to a support assembly pivotally mounted on the frame about a pivot axis which is parallel to and in the vicinity of the front edge of the frame, and an operating and locking member which is fixed with respect to the support assembly and which co-operates with the edge of the frame which is in opposite relationship to said front edge, to cause said support assembly to pivot from a first position in which it extends in the plane of the frame, the panel forming a closure means for the opening by resting on a sealing means provided on the inside edge of the frame, to a second position in which the support assembly is inclined with respect to the plane of the frame about said pivot axis.

In accordance with one of the main features of the invention, said support assembly is formed by a pair of parallel telescopic struts which are substantially perpendicular to the pivot axis, each strut having a slideway member pivotally mounted by one of the ends thereof about said axis, and a slider mounted slidably on said slideway member, the panel being connected to each of said struts by a fixing member having a first lug mounted slidably in said slideway member and a second lug mounted slidably in said slider.

In one embodiment of the invention, the sliding movement of said lugs in said slideway member and in said slider is provided in an oblong opening therein, the ends of the opening in the slideway member forming abutments in respect of displacement of the panel with respect to the support assembly.

The operating and locking member for said support assembly with respect to the frame is coupled to the end of each of the slideway members of said struts, which is opposite to the pivotally mounted end thereof.

The slideway member and the slider of each strut are formed by two U-shaped members which are engaged one into the other to define a box structure, the side walls of which have the openings for sliding movement of said first and second lugs.

In the vicinity of the middle part of its front edge, the panel will have an operating handle involving sliding movement along said struts.

The invention will be better appreciated from the following description which is set forth purely by way of non-limiting example and which will permit the advantages and secondary features of the invention to be clearly understood.

Reference will be made to the accompanying drawings in which:

FIG. 1 is a diagrammatic plan view of part of the arrangement according to the invention, FIG. 2 is a view in cross-section of the arrangement according to the invention in its position as a deflector, FIG. 3 is a view in cross-section of the arrangement according to the invention in a position in which the panel is disposed at the end part of said struts, and FIG. 4 is a diagrammatic view in cross-section of the connection between the panel and the support assembly which carries it.

Referring to the drawings, it will be seen that the arrangement according to the invention is formed by a frame 1 provided on its internal periphery with a seal 2 on which a panel 3 can rest. The panel 3 may be made of glass or sheet metal. Disposed on an internal part 1a of the frame 1 are two fixed members 4, only one of which is shown in the drawings, for pivotally mounting a support assembly for carrying the panel 3. The pivot mounting means co-operates in known manner with a member 5 which forms the movable element of the hinge structure and to which there is coupled the telescopic strut in accordance with the invention. More precisely, each of the two members 5 used in the arrangement is fixed with respect to one end of a slideway member 6, which can be seen in FIG. 4 as being of a U-shaped cross-sectional configuration. The slideway member 6 slidably carries a slider 7 which is also of U-shaped cross-section. The limb portions of the U-shape of each of the members 6 and 7 are profiled in a complementary fashion so that they cannot become disengaged from each other in a transverse direction.

The panel 3 is connected to the telescopic struts 6 and 7 by means of a fixing member 8 which has a first front lug 9 and a second rear lug 10 which respectively co-operate with the slideway member 6 and the slider 7. The slideway member 6 of each strut is connected to the other by means of a transverse bow member 11 which is fixed to each of the ends thereof which are opposite to the ends thereof which are fixed with respect to the pivot mounting member 5.

In its side wall which forms the connection between the two limb portions of the U-shape defined thereby, the slideway member 6 has an oblong opening 12 in which a shaft 13 fixed with respect to the lug 9 is slidable. Likewise, the slider 7 is provided in its corresponding side portion with a slot 14 in which a shaft 15 which is fixed with respect to the lug 10 is slidable.

Reference numeral 16 denotes a handle for locking the arrangement in its position of closing the opening defined by the frame 1. The handle 16 will not be described in detail herein as it is known per se. It will simply be noted that it is fixed with respect to the bow member 11 which connects the ends of the slideway members 6.

On the other side of the bow member 11, the panel 3 has a kind of stirrup 17 which can come into engagement with the central part of the member 11, as shown in FIG. 2. The opening of the stirrup 17 will be directed towards the pivot mounting end at which the support assembly is mounted on the carrier structure, in such a way that the stirrup can be disengaged from the bow member 11 by a translatory movement in the direction F shown in FIG. 2.

By unlocking the handle 16, the opening roof arrangement is placed in the position thereof as shown in FIG. 2. The arrangement is held in that position, that is to say for ventilating the passenger compartment, by a per se known member or arrangement which is not illustrated herein. By acting on the panel 3 in the direction indicated by the arrow F, for example by means of a handle which is disposed in the vicinity of the central front part of the panel and projecting into the passenger compartment, that handle not being shown in the drawings, the shaft member 13 on the lug 9 leaves the end 12a of the oblong opening 12, in the direction of the end 12b of that opening, while at the same time the shaft member 15 which is fixed with respect to the lug 10 leaves the end 14a of the opening 14, in the direction of the opening 14b. At the moment at which the member 15 reaches said end 14b, the translatory movement is continued, entraining the slider 7 along the slideway member 6 until the member 13 comes into a position of abutment against the end 12b of the opening 12. That configuration is illustrated in FIG. 3. It will be seen in that position that the panel 3 is substantially displaced towards the rear of the roof of the vehicle, thus leaving the internal opening defined by the carrier structure 1 wide open, over more than half the dimension thereof. The panel 3 is supported in a highly adequate manner by the slider 7 which remains substantially engaged over the slideway member 6.

It will be seen from these drawings that the amplitude of the translatory movement of the panel 3 is defined by the length of the oblong opening 12 provided in the slideway member 6, which may be virtually as large as the dimension, in the same direction, of the opening which is defined by the carrier structure 1.

To close the arrangement, the panel 3 is moved again towards the front of the vehicle, which in a first phase causes sliding movement of the lugs 9 and 10 in the openings 12 and 14 and then in a second phase a continuation of the sliding movement of the member 13 on the lug 9 in the opening 12 and entrainment by means of the member 15 on the lug 10 of the slider 7, towards the pivotally mounted end of the slideway member 6. The movement in that return direction is stopped by the stirrup 17 engaging onto the bow member 11.

The present invention has the advantage of being simple and robust in construction, while permitting the opening roof arrangement to open the opening defined within the carrier structure 1 to a very substantial extent and in any case over more than half the area thereof.

The invention finds attractive application in the field of motor vehicles and accessories thereof.

We claim:

1. An opening roof arrangement for a motor vehicle roof, comprising a carrier structure (1) in the form of a frame which is capable of being mounted in an opening in a vehicle roof and retained on the edges thereof, a panel (3) which is mounted to a support assembly (5, 6, 7, 11) pivotably mounted on the frame (1) about a pivot axis which is parallel to and in the vicinity of the front edge of the frame, and an operating and locking member (16) which is mounted to the support assembly and which co-operates with a rear edge of the frame to cause said support assembly to pivot from a first position in which it extends in a horizontal plane of the frame (1), the panel (3) forming a closure means for the opening by resting on a sealing means (2) provided on the inside edge of the frame (1), to a second position in which the support assembly is inclined with respect to the horizontal plane of the frame (1) about said pivot axis, characterized in that said support assembly is formed by a pair of parallel telescopic struts (6, 7) which are substantially perpendicular to the pivot axis, each strut having a slideway member (6) which is pivotally mounted at one end (5) thereof about said axis and a slider (7) mounted slidably on said slideway member (6), the panel (3) being connected to each of said struts (6, 7) by a fixing member (8) having a first lug (9) mounted slidably in said slideway member (6) and a second lug (10) mounted slidably in said slider (7).

2. An opening roof arrangement according to claim 1 characterized in that the sliding movement of the lugs (9, 10) in said slideway member (6) and in said slider (7) occurs in an oblong opening (12, 14) therein, ends (12a, 12b) of the opening in the slideway member (6) forming abutments in respect of displacement of the panel (3) with respect to the support assembly.

3. An arrangement according to claim 1 characterized in that the member (16) for operating and locking the support assembly with respect to the frame (1) is coupled to an opposite end of each of the slideway members of said struts.

4. An arrangement according to claim 2 characterized in that the slideway member (6) and the slider (7) of each strut are formed by two U-shaped members which are engaged one into the other to define a closed configuration, the side walls of which have the openings (12, 14) for sliding movement of said first and second lugs (9 and 10).

* * * * *